US010579519B2

(12) United States Patent
Lillibridge et al.

(10) Patent No.: US 10,579,519 B2
(45) Date of Patent: Mar. 3, 2020

(54) INTERLEAVED ACCESS OF MEMORY

(71) Applicant: Hewlett Packard Enterprise Development LP, Houston, TX (US)

(72) Inventors: Mark David Lillibridge, Mountain View, CA (US); Gary Gostin, Plano, TX (US); Paolo Faraboschi, Sant Cugat (ES); Derek Alan Sherlock, Boulder, CO (US); Harvey Ray, Frederick, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 84 days.

(21) Appl. No.: 15/746,618

(22) PCT Filed: Jul. 30, 2015

(86) PCT No.: PCT/US2015/042953
§ 371 (c)(1),
(2) Date: Jan. 22, 2018

(87) PCT Pub. No.: WO2017/019095
PCT Pub. Date: Feb. 2, 2017

(65) Prior Publication Data
US 2018/0217929 A1  Aug. 2, 2018

(51) Int. Cl.
*G06F 12/06* (2006.01)
*G06F 3/06* (2006.01)

(52) U.S. Cl.
CPC ........ *G06F 12/0607* (2013.01); *G06F 3/0611* (2013.01); *G06F 3/0644* (2013.01); *G06F 3/0659* (2013.01); *G06F 3/0673* (2013.01); *G06F 2212/1016* (2013.01); *G06F 2212/1024* (2013.01)

(58) Field of Classification Search
CPC combination set(s) only.
See application file for complete search history.

(56) References Cited

U.S. PATENT DOCUMENTS

| 5,142,638 | A  | 8/1992 | Schiffleger |
| 5,559,970 | A  | 9/1996 | Sharma |
| 5,740,402 | A  | 4/1998 | Bratt et al. |
| 6,405,286 | B2 | 6/2002 | Gupta et al. |

(Continued)

FOREIGN PATENT DOCUMENTS

| JP | H05342095 | 12/1993 |
| JP | 2004055112 | 2/2004 |

(Continued)

OTHER PUBLICATIONS

International Searching Authority, The International Search Report and the Written Opinion, dated Apr. 25, 2016, 13 Pages.

(Continued)

*Primary Examiner* — Yong J Choe
(74) *Attorney, Agent, or Firm* — Trop, Pruner & Hu, P.C.

(57) ABSTRACT

In some examples, each processor of a plurality of processors applies an interleave transform to perform interleaved access of a plurality of memory banks, where for any given memory address in use by the plurality of processors, applying any of the interleave transforms results in selection of a same memory bank of the plurality of memory banks and a same address within the same memory bank.

12 Claims, 3 Drawing Sheets

(56) References Cited

U.S. PATENT DOCUMENTS

| | | |
|---|---|---|
| 7,979,648 B2 | 7/2011 | Saxe et al. |
| 8,819,359 B2 | 8/2014 | Kapil et al. |
| 2005/0182908 A1 | 8/2005 | Kang |
| 2008/0320254 A1 | 12/2008 | Wingard et al. |
| 2010/0228923 A1 | 9/2010 | Lim |
| 2014/0068125 A1* | 3/2014 | Pullagoundapatti .. G06F 13/404 710/110 |

FOREIGN PATENT DOCUMENTS

| | | |
|---|---|---|
| KR | 1020110040103 | 4/2011 |
| KR | 101490327 | 2/2015 |
| WO | WO-2014108718 | 7/2014 |

OTHER PUBLICATIONS

Sohi~ "High-Bandwidth Interleaved Memories for Vector Processors—A Simulation Study"~ IEEE Trans on Computers, V. 42, N. 1, Jan. 1993~ p. 11.

Extended European Search Report, EP Application No. 15899885.6, dated Oct. 29, 2018, pp. 1-12, EPO.

Wikipedia, "Multiprocessing," Jul. 22, 2015, pp. 1-7 (online), Retrieved from the Internet on Nov. 28, 2018 at URL: <en.wikipedia.org/w/index.php?title=Multiprocessing&oldid=672551833>.

* cited by examiner

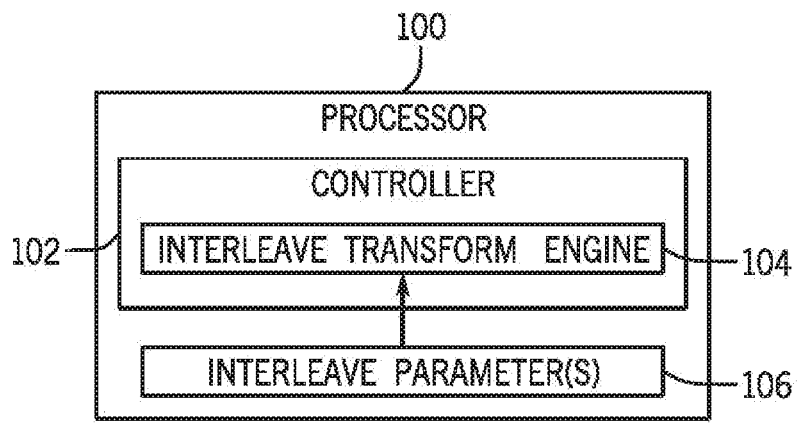

FIG. 1

APPLY, BY EACH PROCESSOR OF MULTIPLE PROCESSORS, AN INTERLEAVE TRANSFORM TO PERFORM INTERLEAVED ACCESS OF MEMORY BANKS, THE INTERLEAVED ACCESS BEING PERFORMED BY EACH PROCESSOR OF THE MULTIPLE PROCESSORS WITHOUT PASSING THROUGH ANOTHER PROCESSOR, WHERE, FOR ANY GIVEN MEMORY ADDRESS IN USE BY THE MULTIPLE PROCESSORS, APPLYING ANY OF THE INTERLEAVE TRANSFORMS ON THE GIVEN MEMORY ADDRESS RESULTS IN SELECTION OF A SAME MEMORY BANK OF THE MEMORY BANKS AND A SAME ADDRESS WITHIN THE SAME MEMORY BANK —202

INTERLEAVED ACCESS OF MEMORY

BACKGROUND

A system can include memory devices, such as dynamic random access memory (DRAM) devices, static random access memory (SRAM) devices, flash memory devices, and so forth. Processors in the system can access the memory devices to read data from or write data to the memory devices.

BRIEF DESCRIPTION OF THE DRAWINGS

Some implementations of the present disclosure are described with respect to the following figures.

FIG. 1 is a block diagram of an example processor according to some implementations.

FIG. 2 is a flow diagram of a process to perform interleaved access of memory, according to some implementations.

DETAILED DESCRIPTION

Figure 3:
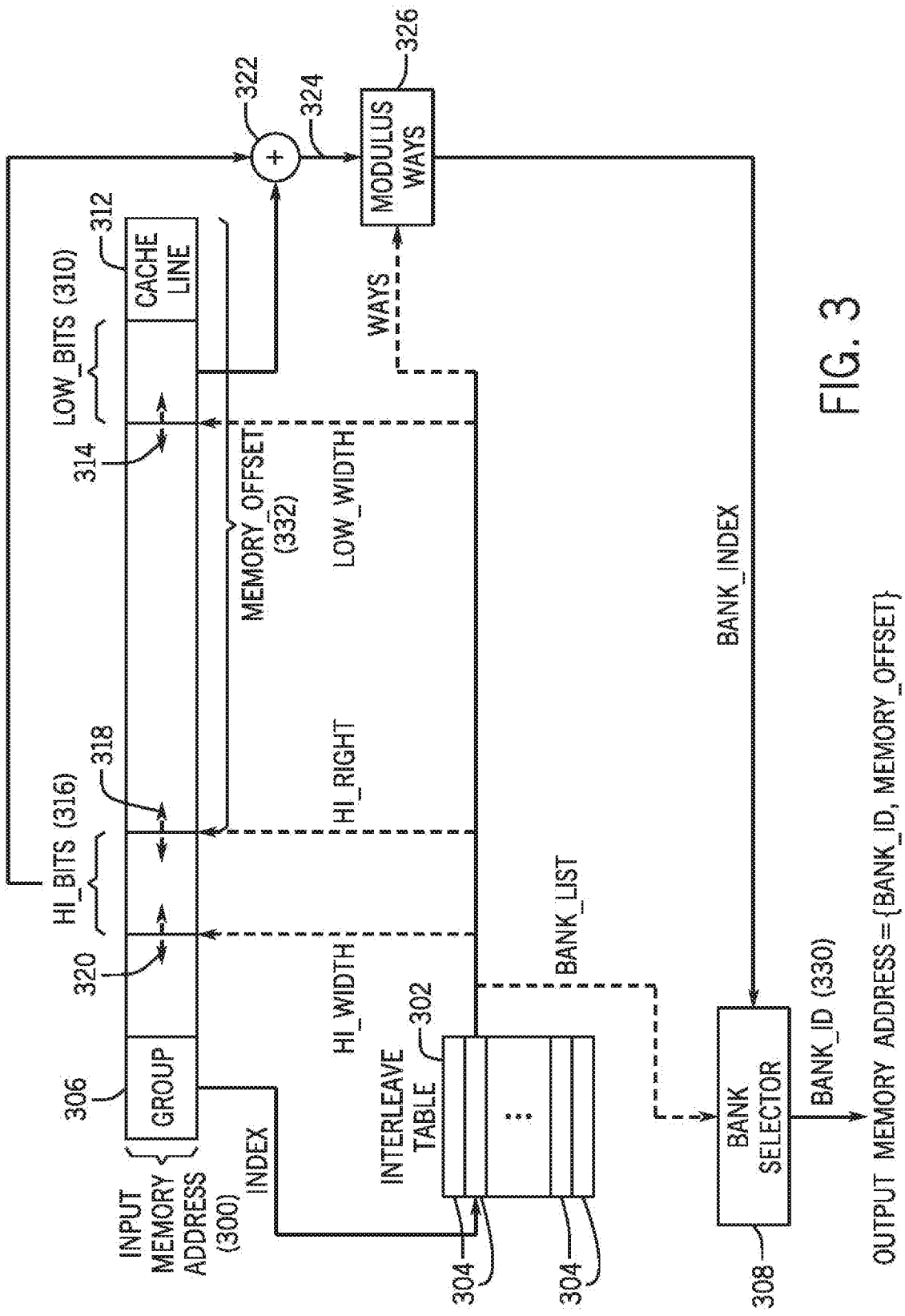
FIGS. 3 and 4 are schematic diagrams of example interleave transforms applied on an input memory address, according to various implementations.

Memory can have access speeds that can be slower than operating speeds of a processor. A processor can refer to any source device that is able to originate a request to access memory. Examples of processors include a microprocessor, a core of a multi-core microprocessor, an input/output (I/O) device or peripheral device that is able to generate a memory request, and so forth. A "memory" can refer to any storage medium, such as a solid state memory, semiconductor memory, disk-based storage, and so forth.

An access speed of a memory can refer to an amount of time involved in accessing a storage location (or storage locations) in the memory in a given memory transaction or how much memory can be retrieved or written in a given time. The slower access speed of the memory may impose a bandwidth constraint on how quickly a processor is able to operate. In other words, while waiting for a memory transaction to complete at the memory, the processor may have to wait and may be unable to perform other operations.

To address this issue, interleaved access of memory can be performed. To allow interleaved access, memory can be divided into multiple memory banks. A processor is able to access different segments of data (e.g., consecutive segments of data) across the multiple memory banks in parallel, so that the effective bandwidth of accessing the memory can be increased. For example, the processor can access data segment 0 in bank 0, access data segment 1 in bank 1, and so forth, at the same time. The processor can access each successive data segment without waiting for the access of the previous data segment to complete, which means that the access of the multiple data segments across multiple memory banks can be completed in a shorter amount of time than if the multiple data segments were accessed sequentially from one memory bank.

A memory bank can refer to any portion of memory, where the memory can include a single memory device or multiple memory devices. A memory device can refer to a memory chip (e.g., solid state memory chip, semiconductor memory chip, phase change memory chip, etc.) or a memory module, such as a dual inline memory module (DIMM) or other type of memory module. A memory device can also refer to disk-based storage or other type of storage.

Multiple processors may be present that are able to perform interleaved access of the same collection of memory banks. The collection of memory banks may be shared among the processors, with each processor able to access all of the memory provided by the collection of memory banks. If the multiple processors apply different interleaving schemes, then it may be possible that different processors select different memory banks in response to a particular input memory address. For example, processor A may select memory bank M1 in response to memory address A1, while processor B may select memory bank M2 in response to memory address A1. If this occurs, then processors A and B may not be able to share data properly, which can result in an error.

For speed reasons, it is desirable that the processors apply their interleave transforms independently, without sharing any common circuitry. Centralizing the work of applying an interleave transform or part of the interleave transform does ensure the processors apply the same transform but slows down the system because all or many of the accesses have to flow through the common circuitry, such that memory accesses may have to traverse a longer distance and likely increase congestion. An example of using common circuitry would be to have each processor handle interleaving for the memory banks directly attached to the processor (referred to as the "local processor"); any processor wishing to access that memory would have to send its accesses through the local processor rather than directly to the memory.

In accordance with some implementations of the present disclosure, multiple processors that are able to access the same collection of memory banks are able to use respective interleave schemes to perform interleaved access of a given collection of memory banks (where the given collection of memory banks is shared by the multiple processors). An interleave scheme can refer to a technique or mechanism of applying an interleave transform of an input memory address to produce a respective output memory address to access a particular of the given collection of memory banks. In some implementations, the respective interleave transforms applied by multiple processors select a same memory bank in response to a given input memory address, where the given input memory address is from memory addresses that are in use by the multiple processors. Memory addresses "in use" by the multiple processors can refer to memory addresses associated with the collection of memory banks that are allowed to be accessed by the multiple processors.

Note that the application of the respective interleave transforms by the multiple processors on an input memory address that is not in use may not result in the selection of the same memory bank.

By using respective interleave schemes that select the same memory bank and address within the memory bank in response to an input memory address that is from memory addresses in use, it can be ensured that different processors would select the same memory bank and address within the memory bank in response to such input memory address, to avoid the issue of the processors selecting different memory banks or addresses within a memory bank in response to the same input memory address.

FIG. 1 is a block diagram of an example processor 100 that includes a controller 102 to control access of a memory (not shown in FIG. 1). In other examples, the controller 102 can be provided outside the processor 100. In some examples, the controller 102 can be a memory controller that issues read commands, write commands, or other types of commands for accessing memory, which can include one or multiple memory devices. In accordance with some implementations, the controller 102 includes an interleave transform engine 104 that applies an interleave transform on an input memory address to produce an output memory address, in accordance with some implementations of the present disclosure. The interleave transform engine 104 receives one or multiple interleave parameters 106. The interleave parameter(s) is (are) used in the application of the interleave transform by the interleave transform engine 104. The interleave parameters(s) 106 may be partitioned into at least one set of interleave parameters. Different sets of interleave parameter(s) can correspond to respective different interleave groups. The different sets of interleave parameter(s) cause respective different behaviors of the interleave transform applied by the interleave transform engine 104. An example of how different interleave parameter(s) can result in different behaviors of the interleave transform applied by the interleave transform engine 104 is explained below in connection with FIG. 3.

An interleave group may correspond to an area of input address space that is uniformly interleaved across a corresponding fixed set of memory banks. As an example, a system may be organized into three interleave groups: (1) a first interleave group containing three memory banks, (2) a second interleave group containing four memory banks, and (3) a third interleave group containing five memory banks. Sequential accesses directed to the first interleave group area may be transformed so they round-robin among the three memory banks, sequential accesses directed to the second interleave group area may be transformed so they round-robin among the four memory banks, and so forth.

More generally, an interleave transform is associated with one set of interleave parameter(s), or by multiple sets of interleave parameter(s). In examples where an interleave transform is associated with multiple sets of interleave parameter(s), the interleave transform engine 104 can identify one of the multiple sets of interleave parameter(s) based on a memory address in a request received from within the processor 100.

In some examples, a system can include multiple collections of memory banks, where each collection of memory banks can include a respective number of memory banks and a respective size of each memory bank. The different collections of memory banks can differ in a characteristic, such as the number of memory banks and/or the size of a memory bank. Thus, for a first collection of memory banks, the interleave transform engine 104 can retrieve a first set of interleave parameter(s) 106 that results in application of the interleave transform in a first manner. To access a second collection of memory banks, the interleave transform engine 104 can retrieve a second set of interleave parameter(s) 106 to apply the interleave transform in a second, different manner. An example of applying the interleave transform in different manners is a follows: for the first collection of memory banks, the interleave transform performs transformation of an input memory address to an output memory address for interleaved access across a first number of memory banks; and for the second collection of memory banks, the interleave transform performs transformation of an input memory address to an output memory address for interleaved access across a second, different number of memory banks.

The controller 102 and the interleave transform engine 104 can be implemented using hardware, or a combination of hardware and machine-readable instructions that are executable on the hardware to perform respective tasks. In some examples, the machine-readable instructions can include software code, while in other examples, the machine-readable instructions can include firmware. As examples, the controller 102 and the interleave transform engine 104 can be implemented using processing circuitry such as a microprocessor, a microcontroller, an application specific integrated circuit (ASIC) device, a programmable gate array, and so forth, which is able to execute machine-readable instructions.

FIG. 2 is a flow diagram of a process that can be performed by the processor 100 according to some implementations. More specifically, the process of FIG. 2 can be performed by the interleave transform engine 104. The process of FIG. 2 can be performed by each processor of multiple processors that each includes a respective interleave transform engine 104. The interleave transform engines 104 of the multiple processors apply corresponding interleave transforms.

In the process of FIG. 2, each processor of the multiple processors applies (at 202) an interleave transform to perform interleaved access of memory banks in a collection of memory banks, the interleaved access being performed by each processor of the multiple processors without passing through another processor. In further implementations, each processor is able to perform its interleave transform independently without relying on common circuitry to perform interleave transforms. In the present discussion, "common circuitry" to perform interleave transforms can refer to any circuitry (e.g., processor (part) or any other controller whether implemented as hardware or a combination of hardware and machine-readable instructions that performs application of an interleave transform (or part of the interleave transform) on behalf of two or more processors that request access to a memory.

For any given memory address in use by the multiple processors, applying any of the interleave transforms on the given memory address results in selection of a same memory bank of the collection of memory banks, and the same address within the selected bank. For any given memory address in use by the multiple processors, the interleave transforms applied by the multiple processors are the same in that the interleave transforms applied on the given memory address would select a same memory bank of the collection of memory banks, and the same address within the selected bank. The processors may be able to get the same result independently because they share most interleave parameters; that is, their corresponding parameters are set to the same values. For interleave groups in use, they may share the interleave parameters associated with those groups. This invariant may be maintained by changing interleave parameters of only interleave groups that are not in use; an example of how to do this will be given later.

An interleaved access performed by a first processor without passing through another processor refers to the interleaved access being performed by the first processor of the memory directly over an interconnect, such as a memory bus or other type of communication fabric. Stated differently, the first processor can perform the interleaved access of the memory without sending a request or other indication regarding the interleaved access to another processor.

FIG. 3 is a schematic diagram of an example arrangement of performing an interleave transform of an input memory address 300, according to some implementations. The various tasks depicted in FIG. 3 can be performed by the interleave transform engine 104 of FIG. 1, in some examples.

FIG. 3 shows an interleave table 302 that has multiple entries 304, where each entry 304 includes a respective set of interleave parameters. The sets of interleave parameters in the corresponding entries 304 of the interleave table 302 can differ from each other, and correspond to different interleave groups. More generally, instead of using the interleave table 302, an interleave data structure can be employed, which can store multiple entries that contain respective sets of interleave parameters.

A group portion 306 of the input memory address 300 provides an index to select one of the interleave table entries 304 (the group portion 306 effectively identifies a respective interleave group). The group portion 306 can include one or multiple bits of the input memory address 300. In the example shown in FIG. 3, the index provided by the group portion 306 selects a particular entry of the interleave table 302, which causes interleave parameters contained in the selected interleave table entry to be retrieved for use in performing the corresponding interleave transform by the interleave transform engine 104.

The interleave parameters retrieved from the selected entry of the interleave table 302 can include the following: a list of banks (BANK_LIST) from which the target bank (BANK_ID) is to be selected based on the result of the interleave calculation (BANK_INDEX). BANK_ID is an identifier of a memory bank in the collection of memory banks. BANK_INDEX is produced from a calculation based on portions of the input memory address 300, as discussed further below.

Another parameter that can be retrieved from the selected interleave table entry is a LOW_WIDTH parameter, which specifies the left margin of a LOW_BITS portion 310 of the input memory address 300. The LOW_WIDTH parameter can specify a number of bits (one or multiple bits) that make up the LOW_BITS portion 310. In the example of FIG. 3, bits to the left are more significant bits of the input memory address 300.

The LOW_BITS portion 310 is a portion of the input memory address 300 that is to the left of a cache line portion 312 of the input memory address 300. The cache line portion 312 selects the bytes within the cache line that are being accessed by the processor. As indicated by the double arrow 314 in FIG. 3, the left margin of the LOW_BITS portions 310 can be shifted left or right depending upon the value of the LOW_WIDTH parameter.

Other interleave parameters of the selected interleave table entry include a HI_RIGHT parameter that specifies a right margin of a HI_BITS portion 316, and a HI_WIDTH parameter that specifies a left margin of the HI_BITS portion 316. The HI_RIGHT parameter can be a number that specifies the bit position of the right margin of the HI_BITS portion 316. The HI_WIDTH parameter specifies a number of bits (one or multiple bits) of the HI_BITS portion 316.

As indicated by double arrows 318 and 320, the right margin 318 of the HI_BITS portion 316 can be shifted left or right depending upon the value of the HI_RIGHT parameter value, while the left margin of the HI_BITS portion 316 can be shifted left or right depending upon the value of the HI_WIDTH parameter.

More generally, the interleave parameters of the selected interleave table entry can include a first parameter (e.g., LOW_WIDTH) selecting a first portion (e.g., LOW_BITS portion) of the input memory address 300 and a second parameter (e.g., HI_RIGHT and/or HI_WIDTH) selecting a second portion (e.g., HI_BITS portion) of the input memory address, where the first and second portions are for use in selecting a memory bank from the list of memory banks specified by the interleave table entry (discussed further below).

Although specific parameters are discussed for selecting portions of the input memory address 300, it is noted that in other examples, other parameters can be used in selecting portions of the input memory address 300.

Another parameter that can be retrieved from the selected interleave table entry is a WAYS parameter, which specifies the number of memory banks in the list of memory banks that corresponds to the selected interleave table entry.

It is noted that the different interleave table entries 304 can specify different lists of memory banks that differ in respective characteristics. Thus, depending upon which list of memory banks is being accessed, the group portion 306 of the input memory address 300 can have different values to select different entries of the interleave table 302.

In accordance with some implementations, the interleave transform engine 104 can apply a binary addition (322) on the value of the LOW_BITS portion 310 and the value of the HI_BITS portion 316, to produce an output value 324. A modulus operation 326 is applied on the output value 324. The modulus operation 326 is based on the value of the WAYS parameter-more specifically, the modulus operation is a MODULUS WAYS operation. If WAYS=4, for example, which indicates there are four memory banks in the collection of memory banks, then the modulus operation 326 is a MODULUS 4 operation, which divides the output value 324 by 4 to produce a remainder, where the remainder is the output of the modulus operation 326.

The output of the modulus operation 326 is the BANK_INDEX value, which is input to a bank selector 308. The bank selector 308 uses the BANK_INDEX to select the BANK_ID from BANK_LIST. The BANK_ID value identifies a memory bank to access in the list of memory banks.

Additionally, a MEMORY_OFFSET portion 332 of the input memory address 300, which is the portion from the least significant bit of the input memory address 300 to the right margin of the HI_BITS portion 316, specifies the address within the selected memory bank as identified by the BANK_ID value 330.

In FIG. 3, the combination of the BANK_ID 330 and the MEMORY_OFFSET 332 makes up an output memory address that is produced by the interleave transform engine 104 after application of the interleave transform on the input memory address 300, where the interleave transform is according to the interleave parameters of the selected interleave table entry.

The different sets of interleave parameters in the interleave table 302 are associated with different interleave groups. In some implementations, it is possible that at least one interleave parameter of a given set of interleave parameters (associated with a given interleave group) should be changed from one value to a different value, such as due to modification of a characteristic of a respective collection memory banks. The modification can be due to addition or removal of a memory bank, for example, or a change in configuration of the collection of the memory banks to change the number of memory banks and/or a size of a memory bank.

In response to determining that a change of at least one interleave parameter associated with the given interleave group should occur, a management entity (e.g., an operating system, an application, or other entity) can notify the multiple processors (such as by sending one or multiple commands or instructions to the multiple processors) to stop accessing a memory area of the collection of memory banks associated with the given interleave group. While the multiple processors are prevented from accessing the memory area, the management entity can change the at least one interleave parameter; each processor's copy of the at least one interleave parameter has to be changed. In response to completion of the change, the management entity can notify the multiple processors that the multiple processors are able to access the memory area.

Figure 4:
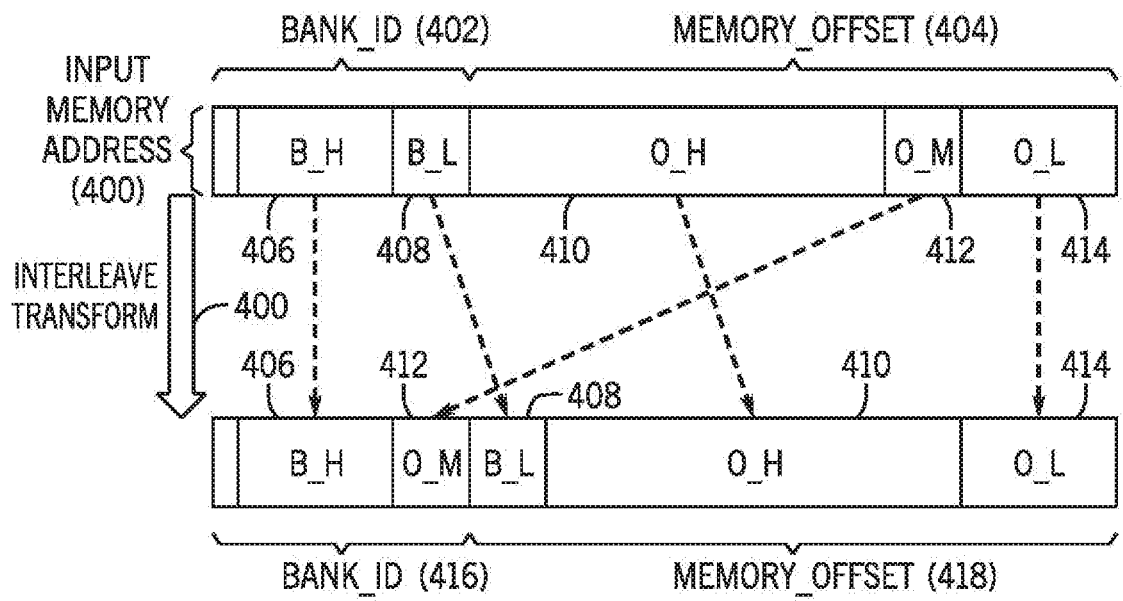

FIG. 4 shows a different type of interleave transform 400 that can be applied by the interleave transform engine 104 of FIG. 1, in accordance with alternative implementations of the present disclosure. In FIG. 4, an input memory address 400 includes a BANK_ID portion 402 and a MEMORY_OFFSET portion 404. The BANK_ID portion 402 is for selecting a memory bank of a collection of memory banks, and the MEMORY_OFFSET portion specifies an offset in the selected memory bank.

The interleave transform 400 causes a transform of the BANK_ID portion 402 and the MEMORY_OFFSET portion 404 to produce a respective modified BANK_ID portion 416 and modified MEMORY_OFFSET portion 418.

The BANK_ID portion 402 includes a B_H part 406 and a B_L part 408. The MEMORY_OFFSET portion 404 includes an O_H part 410, an O_M part 412, and an O_L part 414. The O_L part 414 corresponds to the cache line portion 312 shown in FIG. 3, for example. The interleave transform 400 causes the O_M part 412 of the MEMORY_OFFSET portion 404 to be moved into a modified BANK_ID portion 416. This causes the B_L part 408 of the original BANK_ID portion 402 and the O_H part of the original MEMORY_OFFSET portion 404 to be shifted to the right into the B_L portion 408 and O_H portion 410 of the modified MEMORY_OFFSET portion 418. The modified BANK_ID portion 416 identifies a memory bank of the collection of memory banks, while the modified MEMORY_OFFSET portion 418 specifies an offset within the identified memory bank. In implementations according to FIG. 4, applying any of the interleave transforms of respective processors replaces at least one bit of the bank identifier with at least one bit of the offset identifier.

Figure 5:
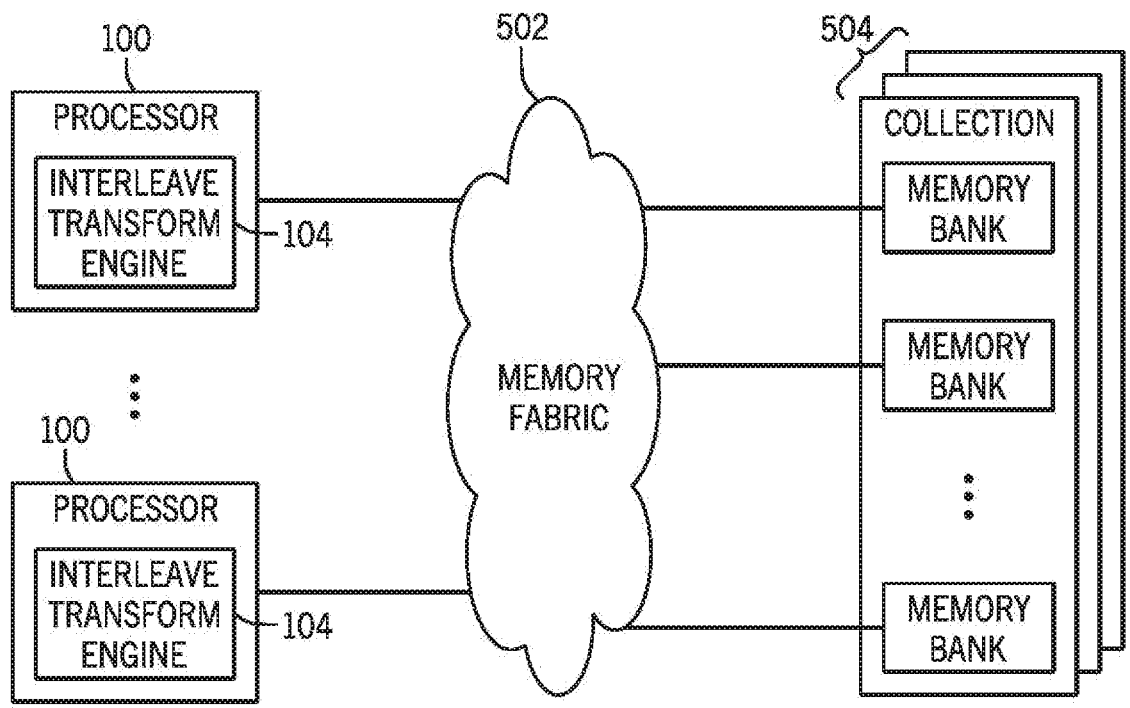
FIG. 5 is a block diagram of an example system including processors that are able to perform interleaved access of memory, according to some implementations.

FIG. 5 is a schematic diagram of an example system that includes multiple processors 100 each including a respective interleave transform engine 104. The system of FIG. 5 can include a computer, or can include a distributed arrangement of multiple computers.

The processors 100 are interconnected over a memory fabric 502 with a collection 504 of memory banks. In FIG. 5, there are multiple collections 504 of memory banks depicted, where a first collection of memory banks can differ in a characteristic (e.g., number of memory banks and/or size of a memory bank) from another collection of memory banks.

Each processor 100 of the multiple processors 100 can perform interleaved access of the memory banks of an individual collection of memory banks 504, based on application of the respective interleave transform by the interleave transform engine 104 of the processor 100. Alternatively, the processors 100 can simultaneously access multiple collections of memory banks.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
applying, by each processor of a plurality of processors, an interleave transform to perform interleaved access of a plurality of memory banks, the interleaved access being performed by each processor of the plurality of processors without passing through another processor, wherein for any given memory address in use by the plurality of processors, applying any of the interleave transforms on the given memory address results in selection of a same memory bank of the plurality of memory banks and a same address within the same memory bank,
wherein each interleave transform is associated with two or more sets of interleave parameters, and
wherein each set of interleave parameters of the two or more sets of interleave parameters is associated with an interleave group, the method further comprising:
in response to a request to access memory:
identifying a first interleave group based on a memory address of the request; and
applying an interleave transform using a set of interleave parameters associated with the first interleave group.

2. The method of claim 1, wherein each interleave transform is associated with at least one set of interleave parameters.

3. The method of claim 2, wherein one set of the at least one set of interleave parameters comprises any or some combination of: a number of memory banks, a list of memory banks, and a first parameter selecting a first portion of a request's memory address to use in determining a given memory bank of the plurality of memory banks.

4. The method of claim 3, wherein the set of interleave parameters further comprises a second parameter selecting a second portion of the request's memory address to use in determining the given memory bank of the plurality of memory banks.

5. The method of claim 1, further comprising:
in response to determining that a change of at least one interleave parameter associated with the first interleave group should occur:
notifying the plurality of processors to stop accessing a memory area of the plurality of memory banks associated with the first interleave group;
changing the at least one interleave parameter associated with the first interleave group; and
in response to completion of the change, notifying the plurality of processors that the plurality of processors are able to use the memory area.

6. The method of claim 5, further comprising:
detecting a change in the plurality of memory banks; and
in response to detecting the change, changing at least one parameter of a set of interleave parameters to a different value.

7. The method of claim 1, wherein each of the memory addresses includes a bank identifier and an offset identifier, the bank identifier to identify a memory bank of the plurality of banks, and the offset identifier to identify an offset within the identified memory bank, and wherein applying any of the interleave transforms replaces at least one bit of the bank identifier with at least one bit of the offset identifier.

8. A first processor comprising:
a controller to access a collection of a plurality of memory banks that is also accessed by a second processor, the controller comprising an interleave transform engine to transform an input memory address to an output memory address for interleaved access of the plurality of memory banks, the transform based on at least one interleave parameter, wherein interleave transforms of the first and second processors are to be applied without using common circuitry and different values of the at least one interleave parameter cause application of the transform by the interleave transform engine in different manners, wherein for any given memory address of memory addresses in use by the first and second processors, the interleave transform of the first processor applied on the given memory address is the same as the interleave transform of the second processor and results in selection of a same memory bank of the plurality of memory banks and a same address within the same memory bank.

9. The first processor of claim 8, wherein the controller is to:
retrieve the at least one interleave parameter from an entry of a plurality of entries of a data structure; and
select the entry of the plurality of entries using a portion of the input memory address as an index into the data structure.

10. The first processor of claim 9, wherein the entries correspond to respective different interleave groups.

11. A system comprising:
a first collection of memory banks;
a plurality of processors to perform interleaved access of the first collection of memory banks, each processor of the plurality of processors to perform the interleaved access by applying an interleave transform that transforms an input memory address to an output memory address, each processor of the plurality of processors performing its interleave transform independently without using common circuitry, wherein for any given memory address of memory addresses in use by the plurality of processors, applying any of the interleave transforms selects a same memory bank of the collection of memory banks and a same address within the same memory bank,
a second collection of memory banks, the second collection of memory banks having a characteristic that differs from a characteristic of the first collection of memory banks, the characteristic comprising at least one selected from among a number of memory banks and a size of a memory bank, wherein an interleaved access of the second collection of memory banks differs in one or both of a number of memory banks accessed and a size of each memory bank accessed from the interleaved access of the first collection of memory banks.

12. The system of claim 11, wherein a given processor of the plurality of processors is to:
use a portion of the input memory address to select a set of interleave parameters from a plurality of sets of interleave parameters; and
apply the interleave transform using the selected set of interleave parameters.

* * * * *